P. B. DELANY.
METHOD OF AND APPARATUS FOR LOCATING SUNKEN BODIES.
APPLICATION FILED DEC. 27, 1916.
1,287,907. Patented Dec. 17, 1918.
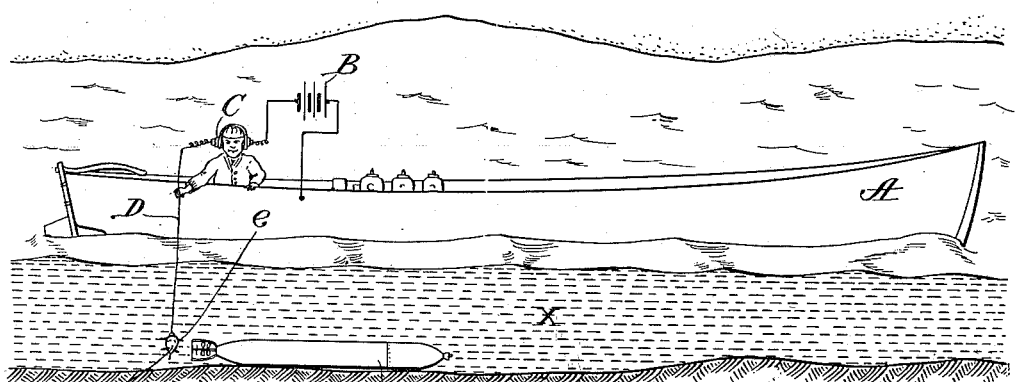
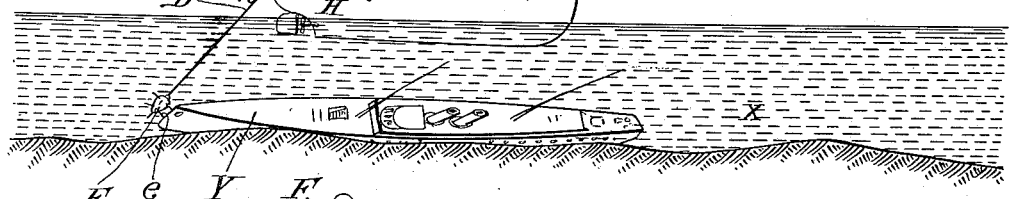
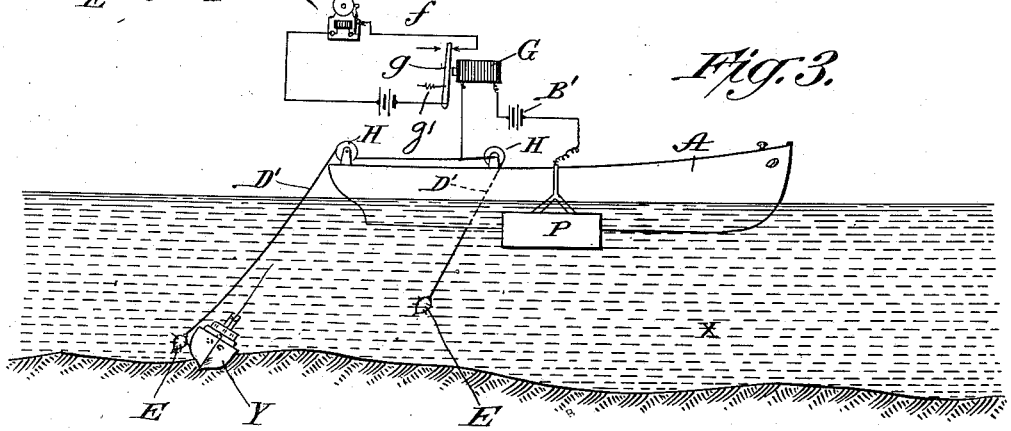
Inventor
Patrick B. Delany.
Witness:
P. F. Gathmann
By his Attorneys:
Baldwin Wright

UNITED STATES PATENT OFFICE.

PATRICK B. DELANY, OF SOUTH ORANGE, NEW JERSEY.

METHOD OF AND APPARATUS FOR LOCATING SUNKEN BODIES.

1,287,907.   Specification of Letters Patent.   Patented Dec. 17, 1918.

Application filed December 27, 1916. Serial No. 139,104.

*To all whom it may concern:*

Be it known that I, PATRICK B. DELANY, a citizen of the United States, residing at South Orange, in the county of Essex and State of New Jersey, have invented certain new and useful Improvements in Methods of and Apparatus for Locating Sunken Bodies.

This invention relates to apparatus for locating sunken bodies and in methods therefor, in which electrically operated detecting or indicating devices are included in a circuit also including an electrode which is lowered into the water and moved over the bottom or through the water until the object sought is found and its presence indicated.

The means heretofore employed or suggested for this purpose have included inductively balanced coils in circuit with telephones, galvanometers or similar indicating devices and so constructed that when said coils are brought close to a sunken metallic body the presence of such body will be shown by the indicator.

According to my invention, I dispense with the coils heretofore employed or suggested and use a bare electrode and depend upon actual contact of the electrode with the sunken body whereby in effect the superficial area of the electrode is many times increased so that when the device is used, in a circuit of high resistance, including the water, the resistance of the circuit is greatly reduced and indicators, originally set or adjusted to be inoperative in a circuit of high resistance, are actuated and thus indicate the interposition of a metallic body in the circuit.

In carrying out my invention, I may install the apparatus on a wharf or on shore, or at any suitable station, or I may equip a suitable boat or vessel for searching or exploring purposes with a generator of electricity and a suitable indicating device, such as a telephone receiver. One side of the generator may be connected with the hull or body of the vessel or with the sheathing thereof or with a plate suspended from the vessel and submerged or partially submerged in the water.

The other side of the generator is connected with a wire or conductor carrying a bare electrode of sufficient weight and of such construction as to be easily lowered and made to sink to a sufficient depth in the water or to the bottom thereof. This electrode may be dragged or moved along the bottom or in the water in such manner as to make actual contact with a sunken metallic body. Preferably the electrode is shaped like a plumb-bob or plummet and is preferably provided with a sharp point or with a plurality of sharp points or contacts whereby should the metallic body be covered with paint or other insulating material, such material may be pierced or scraped away in order that a good metallic connection may be made between the electrode and the sunken body. The electrode is also given such weight that it will readily sink and when raised and lowered may be made to strike a sufficient number of times sharply against the object being explored to remove sufficient insulating material therefrom to insure metallic contact.

In my improved apparatus the circuit is normally through the telephone or other indicator, the bare electrode, the water, and the vessel or the plate suspended therefrom and is normally of high resistance but when the electrode comes in actual contact with a sunken body the resistance is greatly decreased and the presence of the body is thus indicated.

In some cases I prefer to employ a local circuit on the vessel or at the station including a bell or other indicator and to employ a relay in the main circuit which is so adjusted that the local circuit is normally open when the resistance of the main circuit is high, but which is closed as soon as the resistance in the main circuit is sufficiently lowered.

Other features of my invention will be hereinafter explained.

The accompanying drawings are largely diagrammatic.

Figure 1 illustrates a simple form of my invention in which a receiving or head telephone is employed as an indicator in the main circuit.

Fig. 2 is a similar view showing an indicating apparatus included in a local circuit and a relay in the main circuit.

Fig. 3 is a view similar to Fig. 2, but shows how one electrode of the circuit may consist of a plate suspended from a boat or vessel.

As before stated the apparatus may be located on a wharf or at any suitable station, but it is usually placed on a boat or vessel which may be moved about from place to place with the bare electrode suspended and moved about or dragged over the bottom until it strikes a metallic object. If the electrode merely comes in contact with a stone or other nonmetallic object while the presence of such object may be mechanically indicated the electrically operated indicating device will not be actuated.

In Fig. 1 I have shown a motor boat A carrying an electric generator B and a head telephone C. One side of the generator is connected to the side of the vessel which may be metallic or have a metallic sheathing, and the other side of the generator is connected to the telephone, which is in turn connected with a flexible wire, cable or other suitable conductor D carrying an electrode E which is bare or without insulation, is preferably plummet shaped and is also preferably provided with a plurality of sharp points or contact pieces e. The circuit is of course open until the electrode E is lowered into the water when a circuit of high resistance will be established from the generator B, through the telephone C, conductor D, electrode E, water X and vessel A back to the generator. When the electrode comes in actual contact with the sunken metallic body Y the superficial area of the electrode is in effect greatly enlarged and the resistance of the circuit is many times reduced such reduction in resistance being indicated in the telephone circuit and the presence of the sunken metallic body is thus shown.

In Fig. 2 an indicator is shown in the form of a bell or buzzer F having a local circuit f which is opened and closed by the armature g of the relay magnet G. The main circuit includes a generator B' which is connected on one side to the vessel A and on its other side to the relay magnet G. The relay is in turn connected with a conductor D' carrying a bare electrode E.

In this case when the electrode is placed in the water a circuit of high resistance is established through the relay magnet whose armature should be so adjusted by its spring g' that it will remain against its back stop and the local circuit thus remains open but when the electrode E comes in contact with the metallic body the resistance of the main circuit is sufficiently decreased to cause the relay magnet to attract its armature and close the local circuit and thus effect the actuation of the indicator.

The conductor D or D' may be of any suitable kind. It may be an insulated cable or a bare cable carrying an insulated wire. It should be sufficiently flexible to allow of its being readily lowered and dragged or moved through the water or over the bottom in searching for sunken bodies.

Preferably the flexible conductor is wound on a reel or drum H and may pass over a guide pulley h, as indicated in Fig. 2. In this way any desired length of cable or conductor may be paid out, the conductor being maintained in a practically straight or taut condition so as to avoid entanglement with objects at the station or on the search boat.

In Fig. 3 the arrangement is substantially the same as that shown in Fig. 2, except that instead of connecting the generator B' to the hull of the vessel it is connected to a plate P submerged or partially submerged in the water. In this case, also, I have shown how two searching electrodes E may be employed for searching different parts of the bottom or water simultaneously. Any desired number of searching electrodes may be suspended from the same searching vessel and they may all, if desired, be connected with the same indicating or signaling apparatus.

By my improvements, not only can the presence of a sunken metallic body be accurately detected but by moving the electrode over the body or by raising and lowering it several times so as to make and break connections with the body the general shape and dimensions of the body may be obtained or mentally plotted.

My improvements enable me to use apparatus of great simplicity but also of unerring accuracy as it is quite obvious that the instruments may be so adjusted that they will not be actuated during the maintenance of a circuit of high resistance through the water but will immediately respond and become active as soon as the resistance of the circuit is decreased by the interposition in said circuit of a metallic body which enormously increases in effect the superficial area of the bare searching electrode.

While I prefer to rely on actual contact of a plummet or similar device with the sunken body, it is obvious that a bare wire (D or D') may constitute the electrode because a suitably weighted wire of great tensile strength may be used and as soon as it enters the water a circuit of high resistance is produced and the resistance of this circuit is greatly reduced when the wire itself comes in contact with another metallic body of large area.

I claim as my invention:—

1. An apparatus for locating isolated sunken metallic bodies, comprising a normally open local circuit containing an indicating device, and a main or searching circuit comprising a relay for opening and closing the local circuit, a source of electric energy to which the relay is connected, and which is connected on one side with the water, a heavy bare searching electrode connected to the other side of said source of electric energy, means for moving the electrode to make actual contact with a sunken body, whereby the effective area thereof is increased, and electrical connections between said electrode and said relay.

2. An apparatus for locating isolated sunken metallic bodies, comprising a normally open local circuit including an indicating device, a relay, the armature of which opens and closes the local circuit and which is adjusted to hold said circuit normally open, a main circuit comprising a relay magnet, a source of electric energy connected therewith and also connected on one side with the water, a heavy bare searching electrode connected with said relay and through which an electric circuit of high resistance is established through the water when the electrode is lowered thereinto, and means for moving the electrode into actual contact with a sunken metallic body and thus greatly reduce the resistance of the circuit and cause the relay to attract its armature and close the local indicating circuit.

3. An apparatus for locating sunken metallic bodies, comprising a source of electric energy, an electrical connection between the source of energy and the water, an electrode having a plurality of bare projecting points, means for moving said electrode into actual contact with a sunken body, circuit connections between the electrode and the source of electric energy, and an indicating device included in the circuit.

4. An apparatus for locating submerged metallic bodies comprising an indicator, a source of current for said indicator, said source of current being connected with the body of water in which said metallic body is submerged, a flexible electric conductor for said indicator, a pointed bare electrode connected to said conductor, and a weight supporting said electrode to insure by impact electrical connection between said weighted electrode and said submerged metallic body for manifestation of said connection in the indicator.

5. The method of locating an isolated metallic article submerged in a body of water, which consists in forming an electrical circuit of high resistance between a plurality of electrodes, one of which is movable at will, and including a portion of said body of water and said article, then lowering the resistance of said circuit by moving said movable electrode into contact with the article to increase the effective electrical area of the movable electrode.

6. The method of locating an isolated metallic article submerged in a body of water, which consists in forming an electrical circuit of high resistance between a plurality of electrodes, one of which is movable at will, and including said article and a portion of said body of water, lowering the resistance of said circuit by moving said movable electrode into contact with the article to increase the effective electrical area of the movable electrode and indicating the electrical change in the circuit.

7. An apparatus for locating isolated metallic articles disposed in a body of water, comprising a plurality of electrodes, one of which comprises a bare movable weight, a source of electrical energy directly connected to said electrodes, a circuit of high resistance including the article and a portion of the body of water completing the electrical connection between the electrodes, and means for moving said bare electrode into contact with the article to increase the effective electrical area of said electrode.

8. An apparatus for locating isolated metallic articles disposed in a body of water, comprising a plurality of electrodes, a source of electrical energy directly connected to said electrodes, a circuit of high resistance including the article and a portion of the body of water completing the electrical connection between the electrodes, means for moving one of the electrodes into contact with the article for increasing the effective electrical area of the movable electrode and decreasing the resistance of the high resistance circuit, and means for indicating the electrical change in said circuit.

In testimony whereof, I have hereunto subscribed my name.

PATRICK B. DELANY.